(12) United States Patent
Vega-Garcia et al.

(10) Patent No.: US 7,554,922 B2
(45) Date of Patent: *Jun. 30, 2009

(54) METHOD AND SYSTEM FOR PROVIDING ADAPTIVE BANDWIDTH CONTROL FOR REAL-TIME COMMUNICATION

(75) Inventors: Andres Vega-Garcia, Newcastle, WA (US); Mu Han, Redmond, WA (US); Qianbo Huai, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 129 days.

This patent is subject to a terminal disclaimer.

(21) Appl. No.: 11/560,445

(22) Filed: Nov. 16, 2006

(65) Prior Publication Data

US 2007/0086485 A1    Apr. 19, 2007

Related U.S. Application Data

(63) Continuation of application No. 10/054,060, filed on Jan. 22, 2002, now Pat. No. 7,151,749.

(60) Provisional application No. 60/298,181, filed on Jun. 14, 2001.

(51) Int. Cl.
*H04J 3/14* (2006.01)

(52) U.S. Cl. .................. 370/241; 370/252; 370/465; 370/503

(58) Field of Classification Search ............ None
See application file for complete search history.

(56) References Cited

U.S. PATENT DOCUMENTS

| | | | | |
|---|---|---|---|---|
| 4,979,041 | A * | 12/1990 | Schreiber | 375/240.25 |
| 5,784,572 | A * | 7/1998 | Rostoker et al. | 709/247 |
| 6,272,539 | B1 * | 8/2001 | Cuomo et al. | 709/223 |
| 6,657,983 | B1 * | 12/2003 | Surazski et al. | 370/337 |
| 6,680,976 | B1 * | 1/2004 | Chen et al. | 375/240.26 |
| 6,891,798 | B1 * | 5/2005 | Yip et al. | 370/230 |
| 7,032,020 | B2 * | 4/2006 | Gross | 709/224 |
| 2002/0064180 | A1 | 5/2002 | Takeda et al. | |
| 2002/0176367 | A1 * | 11/2002 | Gross | 370/252 |

OTHER PUBLICATIONS ifone4u.com, IFONE4U Service Technical Support, 2001 (p. 1-2) www.ifone4u.com.
Netscape, "What Type of Audio Compression Algorithms Are Used in Conference?," Jun. 1997 (pp. 1-2) www.help.netscape.com.
Microsoft Widows Technologies, Chapter 11: Understanding the H.323 Standard, Microsoft Corporation, Dec. 1999 (pp. 1-10).

(Continued)

*Primary Examiner*—William Trost, IV
*Assistant Examiner*—Roberta A Shand
(74) *Attorney, Agent, or Firm*—Merchant & Gould, P.C.

(57) ABSTRACT

A method and system for dynamically altering the transmission settings of one or more computing devices engaged in a real-time communication session is presented. The devices exchange meaningful and dummy control packets according to a standard control protocol. The approximate bandwidth available on the network is then calculated based on the difference in arrival times between at least one of the dummy control packets and at least one of the meaningful control packets. Once the approximate bandwidth available on the network is computed, the one or more devices adjust outgoing audio and video data streams using a quality control mechanism. The quality control mechanism enables the one or more devices to transmit data in a way that maximizes the user experience during the real-time communication session.

13 Claims, 10 Drawing Sheets

OTHER PUBLICATIONS

Srinivasan, Keshav, "Packet-Pair Flow Control," AT&T Bell Laboratories, 1994 (pp. 1-45).

NECResearch Index (Document Shows the Publication Date for AD Reference).

* cited by examiner

METHOD AND SYSTEM FOR PROVIDING ADAPTIVE BANDWIDTH CONTROL FOR REAL-TIME COMMUNICATION

CROSS-REFERENCE TO RELATED APPLICATION

The present application is a continuation of U.S. patent application Ser. No. 10/054,060 filed on Jan. 22, 2002 now U.S. Pat. No. 7,151,749, which application claims the benefit of U.S. Provisional Patent Application No. 60/298,181, filed on Jun. 14, 2001, which applications are hereby incorporated in their entireties by reference.

TECHNICAL FIELD

This invention relates generally to bandwidth control over a network, and more particularly, relates to methods and systems for optimizing bandwidth usage during real-time communication over a network between one or more computers.

BACKGROUND OF THE INVENTION

Today, the Internet is one of the primary tools used for exchanging and communicating information. Increasingly more and more business models, social exchange forums (e.g., dating services), and even commercial and consumer activities are based solely around the Internet. Similar to the telephone system of the early 1900s, businesses and individuals alike are finding that the requirement of the Internet for communication and gathering of information is something they cannot operate without. However, with this growth of dependency on, and use of the Internet, more and more demands are being placed on the performance of the network. This is especially true with high capacity data such as streaming media, including streaming audio and streaming video data. Users who access and exchange audio and video require that consistent monitoring of performance be carried out in order to ensure network quality. A consequence of the need for higher quality of service is the need for more accurate and extensive measurement and usage of bandwidth.

Bandwidth is a term that describes the amount of data that can be transmitted in a fixed amount of time between one or more computers communicating over a network, such as the Internet. The faster the data is exchanged between computers, the higher the bandwidth must be for that connection. Bandwidth estimation is the process of measuring the bandwidth over the network to ensure network quality. Currently, the most widely used bandwidth measurement techniques involve directly measuring the fastest rate that traffic can be sent from one computer to another. This usually entails sending test or probing packets, from a sending device to a receiving device and measuring the time taken to transmit a certain amount of data. Oftentimes, probing packets are sent in pairs (packet pairs) back-to-back, such that the second packet is sent immediately after the first. The node that receives the packets detects the time delay between the two packets upon their arrival. Assuming that all the intermediate routers send the probing packet pairs back-to-back, the arrival time of the first packet also marks the starting time of the second packet. Hence, the time delay detected gives the amount of the time that the network as a whole takes to send the second packet. The receiving node then divides the size of the second packet by the time delay; the result is the estimated bandwidth (bites/sec).

However, while this method of bandwidth estimation can be effective, the sending of probing packets in addition to regular data and control packets further increases the amount of traffic being exchanged over the network. This problem is even more menacing when exchanging large scale data such as video and audio. Moreover, for real-time communication of video and audio data, accurate estimation of the bandwidth is not enough to ensure network quality. Practical methods and tools for adapting to changing network conditions are necessary in order to truly enhance the user experience.

SUMMARY OF THE INVENTION

The invention relates to a method and system for approximating the available bandwidth over a network without significantly increasing network traffic. The invention also relates to a method and system for dynamically altering the transmission settings of the one or more devices engaged in a real-time communication session with respect to changing network conditions. Such network conditions include the approximate bandwidth capacity, the data loss rate, and other factors.

In accordance with the invention, devices engaged in communication send and receive control packets to and from one another according to a standard control protocol. Some of the control packets are meaningful control packets, which contain control data such as packet sequence, timing, and other information useful for controlling session performance and performing network monitoring. Conversely, other control packets sent and received by the devices are referred to as "dummy" control packets, which are smaller in size than the meaningful control packets and include little or no meaningful data. Each of the devices engaged in the session use the difference in arrival times between the dummy control packets and the meaningful control packets to approximate the bandwidth available during a communication session. Once this value is computed, a quality control mechanism residing on one or more of the devices uses this information to adjust its outgoing audio and video data streams, thus avoiding either overflowing or under-using its bandwidth capacity. By adjusting the outgoing data streams, the user experience during the real-time communication session is maximized.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

The present invention relates to a method and system for enabling two or more devices on a computer network to engage in real-time communication with one another. In various embodiments of the invention, the devices send and receive control packets to and from one another according to a standard networking protocol. Some control packets sent and received by the devices contain meaningful data, such as packet sequence, timing, and other control information useful for controlling session performance and performing diagnostic review. Conversely, other control packets sent and received by the devices, referred to as "dummy" control packets, are smaller in size than the meaningful control packets, and include little or no meaningful data beyond the basic packet headers and data fields required by the packet format. Each of the devices that engage in the real-time communication use the difference in arrival times between the dummy control packets and the meaningful control packets to approximate the bandwidth available during the session.

In the description that follows, the term "streaming media" will be used at times to refer to video, audio and multimedia data that is delivered over a network. As such, streaming media can include the delivery of movies from a server to a personal computer over the Internet, the transmission of music over the Internet via a live broadcast, video conferencing sessions conducted online, and any other real-time communication sessions. Also, "real-time communication" refers to a session established between one or more nodes in which streaming media is exchanged. Typically, these sessions (transactions conducted over a network) are executed according to network protocols designed to enhance and support audio, video and interactive multimedia applications. This includes protocols such as the Real-time Transport Protocol (RTP), the Real-time Control Protocol (RTCP), the Resource Reservation Protocol (RSVP), and the Real-Time Streaming Protocol (RTSP). All of these protocols provide data delivery, transport and control mechanisms designed specifically to support real-time communication. While general reference will be made throughout the detailed description to RTCP as a means of data transmission, those skilled in the art will appreciate that the methods of the invention can apply to any other network protocols suitable for transporting audio and video data.

Figure 1:
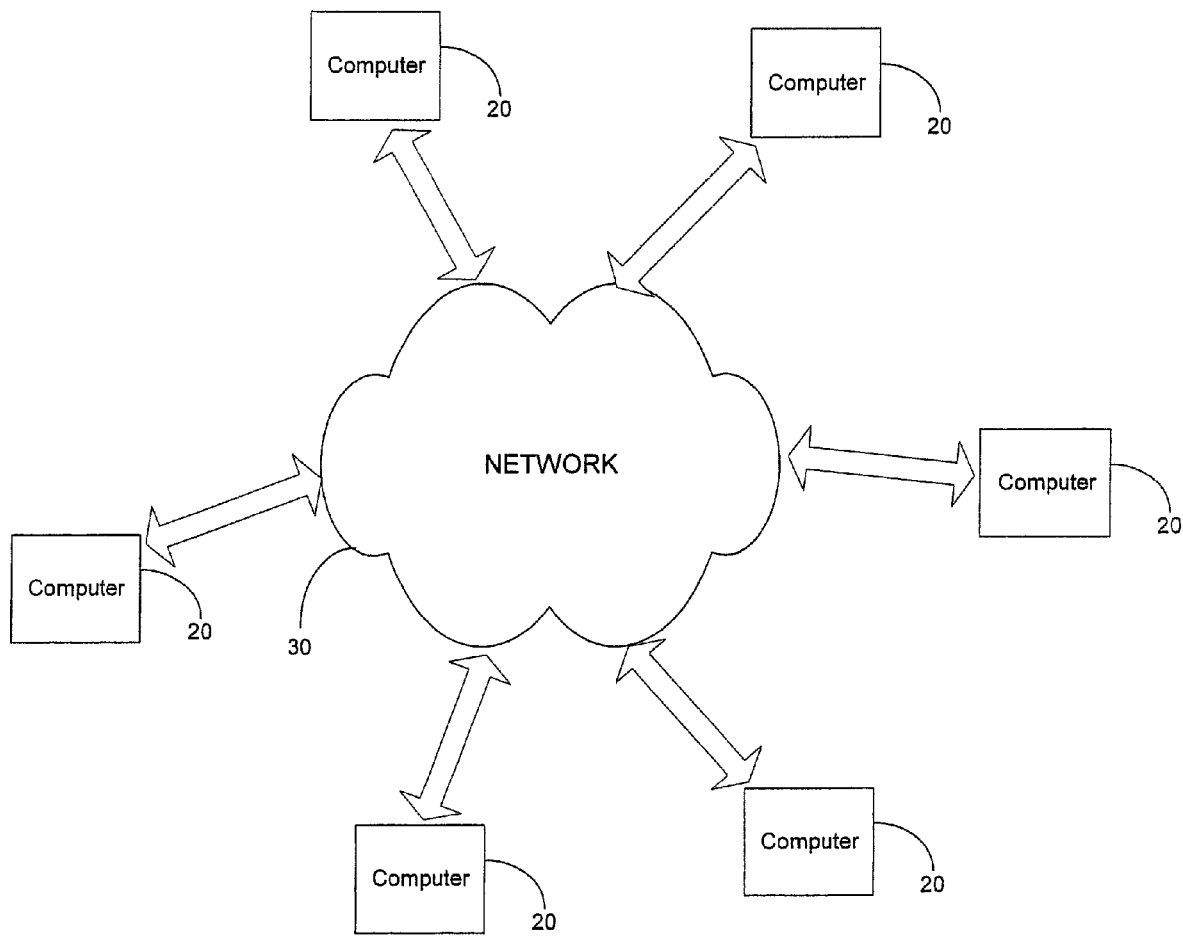
FIG. 1 is an example of a computer network.

An example of a networked environment in which the invention may be used will now be described with reference to FIG. 1. The example network includes several computers 20 communicating with one another over a network 30, such as the Internet, as represented by a cloud. Network 30 may include many well-known components, such as routers, gateways, hubs, etc. and may allow the computers 20 to communicate via wired and/or wireless media.

Figure 2:
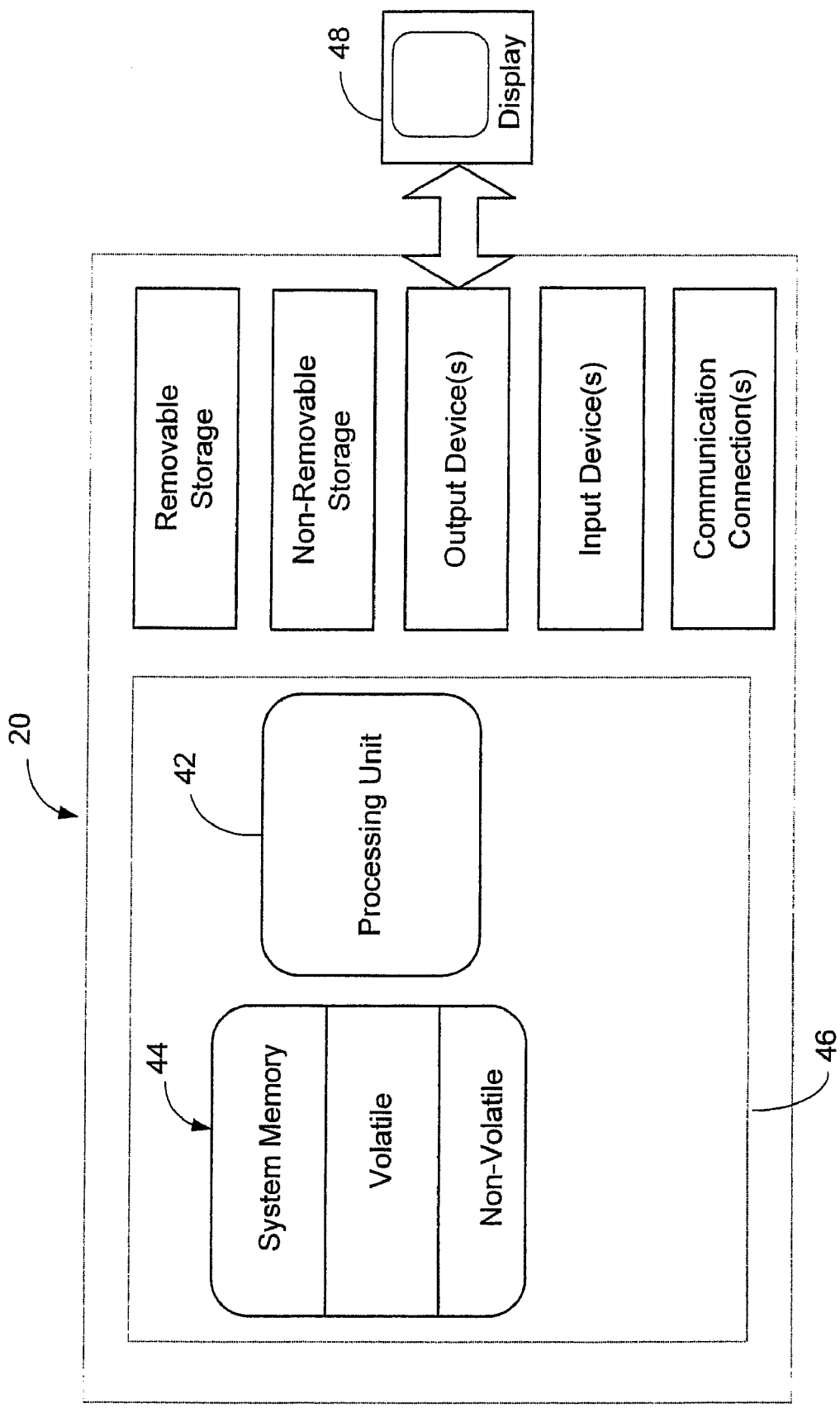
FIG. 2 is an example of a computer.

Referring to FIG. 2, an example of a basic configuration for a computer on which the system described herein may be implemented is shown. In its most basic configuration, the computer 20 typically includes at least one processing unit 42 and memory 44. Depending on the exact configuration and type of the computer 20, the memory 44 may be volatile (such as RAM), non-volatile (such as ROM or flash memory) or some combination of the two. This most basic configuration is illustrated in FIG. 2 by dashed line 46. Additionally, the computer may also have additional features/functionality. For example, computer 20 may also include additional storage (removable and/or non-removable) including, but not limited to, magnetic or optical disks or tape. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the computer 20. Any such computer storage media may be part of computer 20.

Computer 20 may also contain communications connections that allow the device to communicate with other devices. A communication connection is an example of a communication medium. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. The term computer readable media as used herein includes both storage media and communication media.

Computer 20 may also have input devices such as a keyboard, mouse, pen, voice input device, touch input device, etc. Output devices such as a display 48, speakers, a printer, etc. may also be included. All these devices are well known in the art and need not be discussed at length here.

Figure 3:
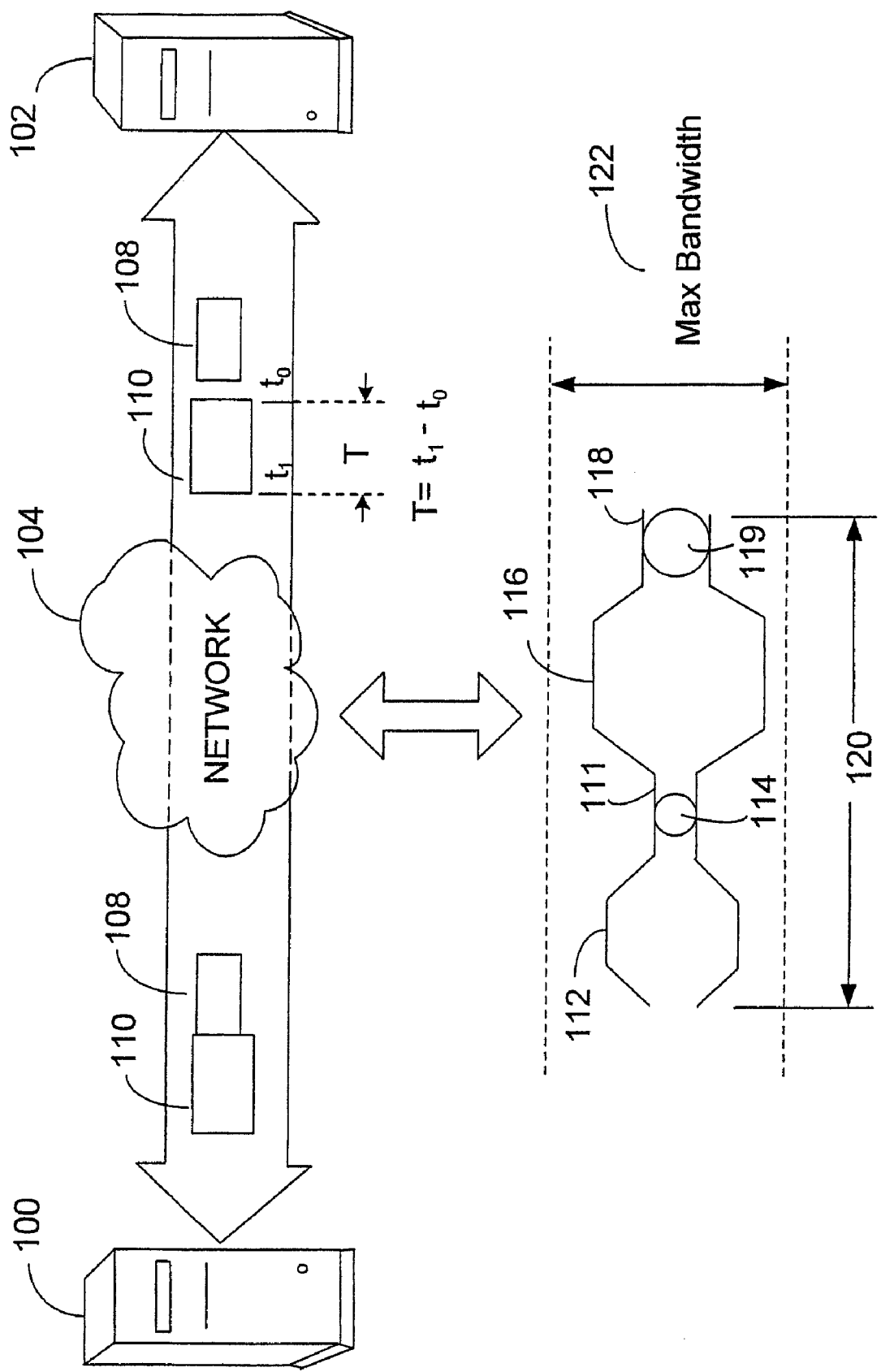
FIG. 3 is a diagram illustrating two computing devices exchanging meaningful and dummy control packets during a real-time communication session in accordance with an embodiment of the invention.

In an embodiment of the invention, two or more network devices send and receive both meaningful control packets and dummy packets to one another over the course of a communication session, as illustrated in FIG. 3. The network devices, generally labeled 100 and 102, engage in the session over a network 104, such as the Internet. A session is a network transaction that is established and conducted between two or more network devices in real-time or non-real-time. This includes transactions such as exchanging music or video data from one network device to another, conducting an on-line shopping session, engaging in on-line chat, and other transactions involving the exchange of data between two or more communicating devices. During the communication session, for the purpose of bandwidth estimation, the network device 100 sends a dummy packet 108 to the network device 102, along with a corresponding meaningful control packet 110. The dummy packet 108 contains no meaningful data, while the meaningful control packet 110 contains control and diagnostic data associated with the session, such as packet loss rate, timing and sequence information.

The dummy packet 108 and meaningful control packet 110 are placed onto the network 104 by device 100. Device 104 places the packets onto the network back-to-back, according to its link speed, which is the speed at which the device can place data (measured in bits per second, or bps) onto the network 104. Because the packets are placed back-to-back, there is no delay in time between them. Once put onto the network, the packets may experience periods of network congestion, known as bottlenecks. Bottlenecks 111 and 119 occur within a network in situations where bandwidth, the rate at which a fixed amount of data can be transmitted between two or more devices, is limited. As shown in the figure, the network 104 is a chain of interconnected links (network links) 112-118, which define the path 120 between device 100 and 102. Between each link are routers, hubs, switches, proxy servers, or any other network devices that act as intermediate point of connection within the path 120. As the illustration shows, links 112 and 116 possess a greater bandwidth capacity than links 114 and 118, and more closely approximate the maximum bandwidth 122 of the network.

Once the packets are transmitted across path 120 and received by device 102, the time delay between them is calculated. As shown in the figure, the time delay between packets is T', which is calculated as the difference between the arrival time of the dummy packet 110 and the meaningful control packet 108 ($T=t_0-t_1$). The receiving device 102 calculates the bandwidth across the path 120. This calculation is given by the following formula:

$$\text{Approximate Bandwidth}(bps) = \frac{\text{size of control packet 110(bits or bytes)}}{T(\text{sec})}$$

The time and size information of the meaningful control packet 110 and dummy control packet 108 are intrinsic parameters specified by the packet itself, and can be interpreted by device 102 according to a standard network protocol. In an embodiment of the invention, the above-described process is explained further with respect to control packets implemented according to the Real-Time Control Protocol, or RTCP.

RTCP is a control protocol that works in conjunction with RTP, the Real-Time Transport Protocol. RTP is commonly integrated into devices capable of processing real-time data by way of an RTP module, a software component having computer-executable instructions for implementing the control protocol. RTP, the transport protocol for RTCP packets, provides end-to-end delivery services to support applications transmitting real-time data, e.g., interactive audio, video, and other streaming media over a network. Typically, RTP runs on top of UDP (User Datagram Protocol) to utilize its multiplexing and checksum services. Other transport protocols besides UDP can also carry RTP as well.

Figure 4:
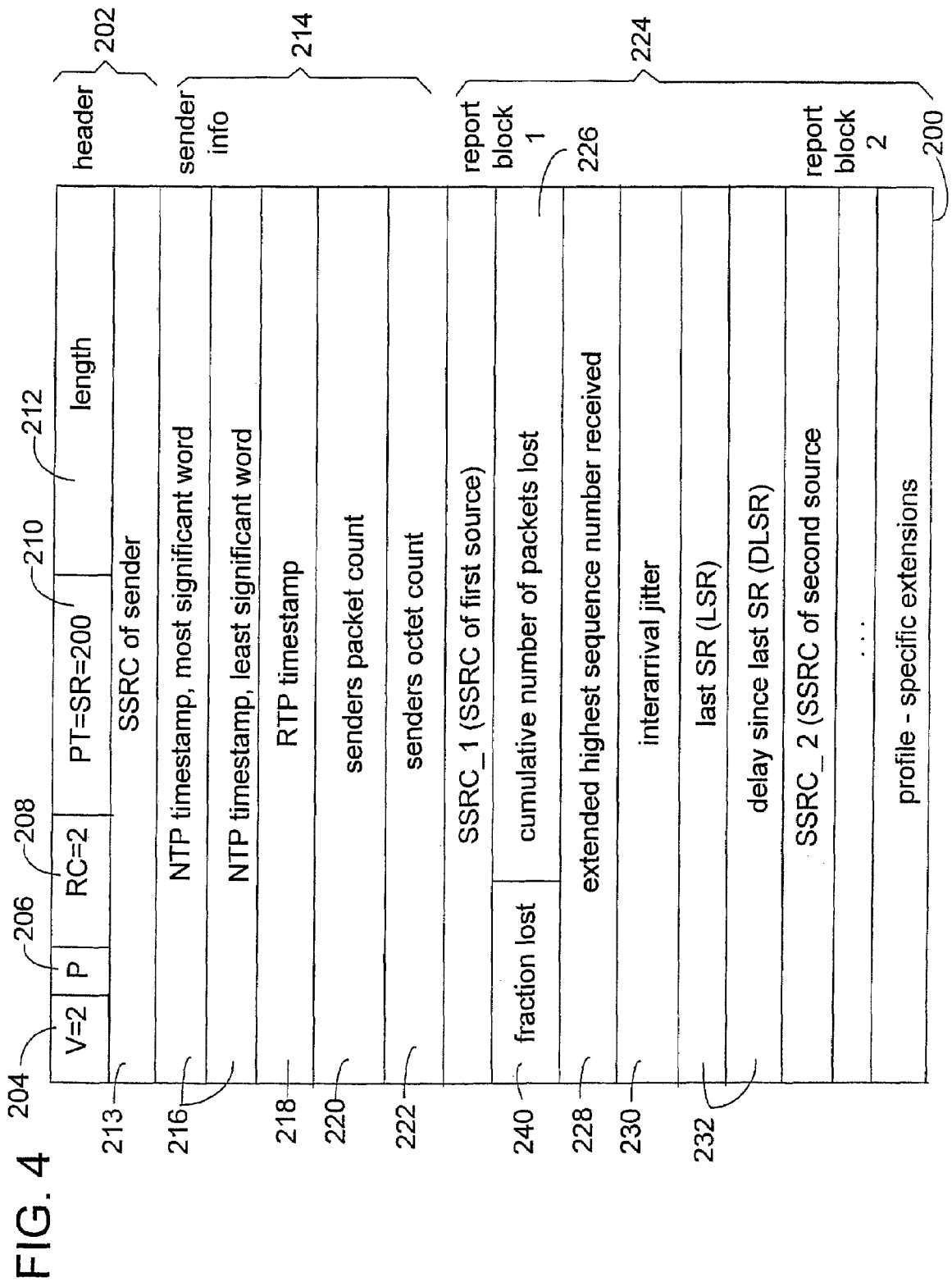
FIG. 4 is a diagram illustrating an example of a meaningful control packet that is exchanged during the real-time communication session shown in FIG. 3.

Referring to FIG. 4, a meaningful control packet 200, formatted as an RTCP "sender report" is provided for illustrative purposes. Other meaningful RTCP control packet formats include a receiver report and a source description packet (not shown). In general, the meaningful control packet 200 contains numerous data fields that provide both packet control and diagnostic information. As the name "sender report" implies, a sending device transmits the packet to a receiving node during the real-time communication session. The meaningful control packet 200 includes a packet header 202, which contains data fields for specifying the version of RTP being used by the sender 204, padding 206, the number or reports included within the packet 208, the packet type 210, the length of the packet (in bits) 212, and the Synchronization Source Identifier (SSRC) 213, which is a unique number assigned to the sending device to distinguish it from other devices involved in the session. In addition to the header 202, the meaningful control packet 200 also contains sender specific information 214 such as the NTP time stamps 216 and RTP time stamp 218 for specifying the origination and transmittal time of the meaningful control packet 200. The packet count 220 and octet count 222 are also provided to specify the number of the control packets 200 sent out by the sending device during the session.

The meaningful report control packet 200 may also include one or more reception report blocks 224, which convey meaningful statistics related to the reception of RTCP packets from the sending device. The number or reception report blocks 224 can vary from one device to another, or one application to another, making the size of the meaningful control packet 200 variable also. Reception report blocks 224 contain information such as the number of packets lost since the sending device began transmitting packets 226, packet sequence information 228, and the interarrival jitter 230. The interarrival jitter data field 230 specifies the mean deviation of the difference in packet spacing at the receiver compared to the sender for a pair of packets. This is equivalent to the total elapsed time between a pair of control packets being sent, and the time they are received by a receiving device. Also included within the meaningful control packet 200 are data fields 230 for specifying the time delay between sender reports transmitted during the session. Still further, the packet 200 also allows for the inclusion of profile specific information, which can be used to store the bandwidth information, packet loss rates or any other data.

As can be seen in FIG. 4, several data fields comprise the sender report control packet 200 to provide meaningful information pertaining to the sending device and the session. The contents of these data fields can be interpreted by devices involved in the session, or analyzed by a third party network-monitoring device. In contrast to the meaningful control packet of FIG. 4, however, an embodiment of the invention uses a control packet formulated according to the RTCP protocol that contains little or no meaningful information. This type of packet is referred to as a dummy control packet.

Figure 5:
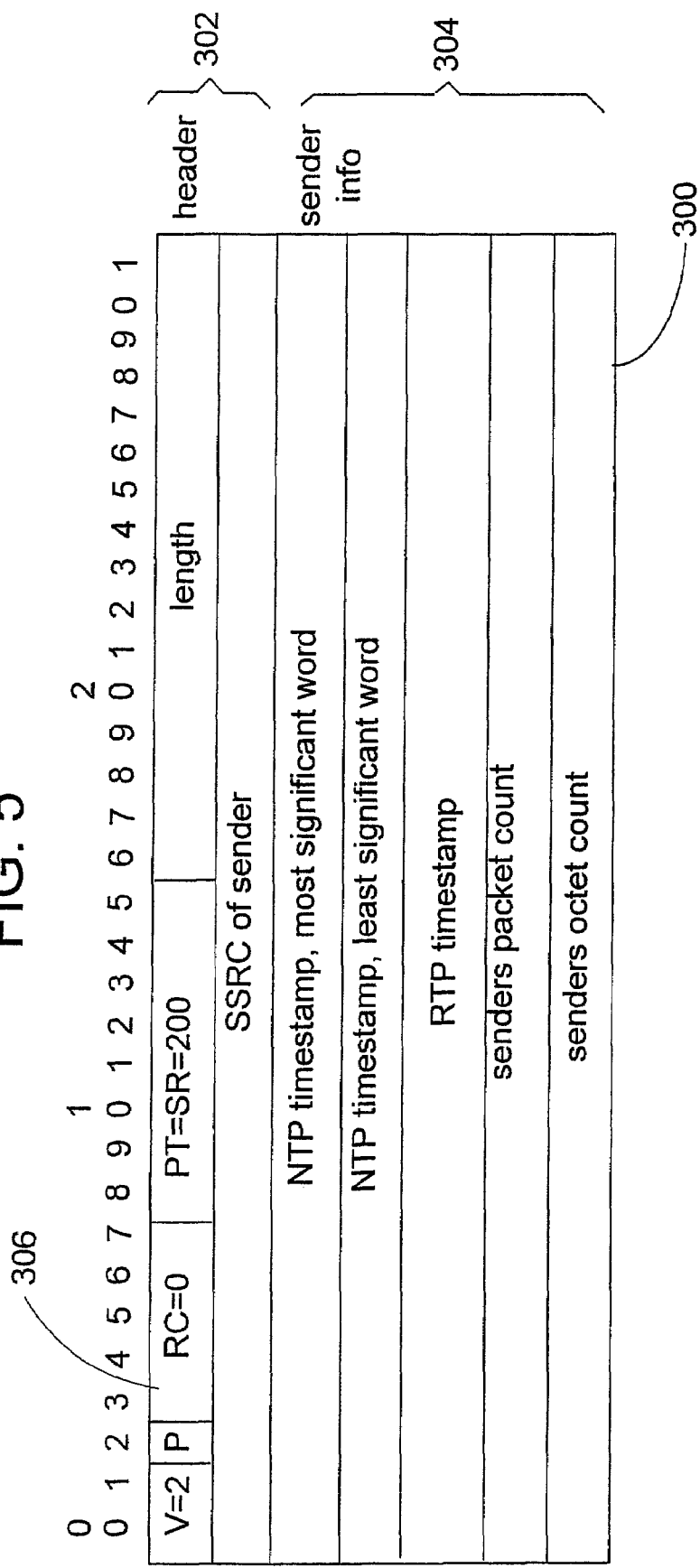
FIG. 5 is a diagram illustrating an example of a dummy control packet that is exchanged during the real-time communication session shown in FIG. 3.

In FIG. 5, an example of a dummy control packet 300 is illustrated. The dummy control packet 300 is transmitted during the session in conjunction with a meaningful control packet 200, such as the sender report control packet of FIG. 4. In various embodiments of the invention, it is sent before the transmission of each meaningful control packet 200, while the meaningful control packet is sent randomly with a minimal interval of 5 *x. The variable x is a random number in the range of 0.5 to 1.5, which is the standard range for control packets defined by RTCP. The dummy control packet 300 contains the basic header 302 and sender information data fields 304, but does not contain reception report blocks 224, as does the meaningful control packet of FIG. 4. Consequently, the dummy control packet 300 is generally smaller in size than a meaningful control packet, and has a reception report count 306 that is always equal to zero. Because a dummy control packet 300 is sent out in connection with every meaningful control packet transmitted during a session, the dummy control packet and the meaningful control packet constitute a packet pair.

Once a device receives the packet pair, the time information 308 of the dummy control packet 300, and that of the meaningful control packet are analyzed to determine the time delay between packets (e.g., analyzing the timestamp data of the meaningful control packet). In calculating the time delay, an approximation of the bandwidth capacity existing between the sending and receiving devices is computed by dividing the delay by the known size of the meaningful control packet and/or dummy control packet 300. This process of calculating the bandwidth is repeated from multiple packet pairs over a period of time so that a more accurate result for the final bandwidth is computed. The more packet pairs received for performing the computation, the more accurate the final result will be. This bandwidth information can then be reported to the RTP module, and communicated by the receiving device to the sending device and other devices engaged in the session.

In the case of RTP sessions, such as during the transmission of streaming media between multiple devices, meaningful control packets are exchanged between nodes periodically to report control and diagnostic characteristics of the network 104. This reporting mechanism is an intrinsic characteristic of the RTCP protocol as a control mechanism of RTP. As set forth in the embodiment of the invention described above, this also means that dummy packets are sent periodically in connection with each meaningful control packet, thus providing persistent "probing" of the network. Probing refers to the process of monitoring network performance using one or more packets having known (controlled or fixed) characteristics. The data provided by the dummy packet (controlled data), and that of the meaningful control packet (variable data), provide a way of persistently approximating the bandwidth capacity between devices engaged in the session.

Figure 6:
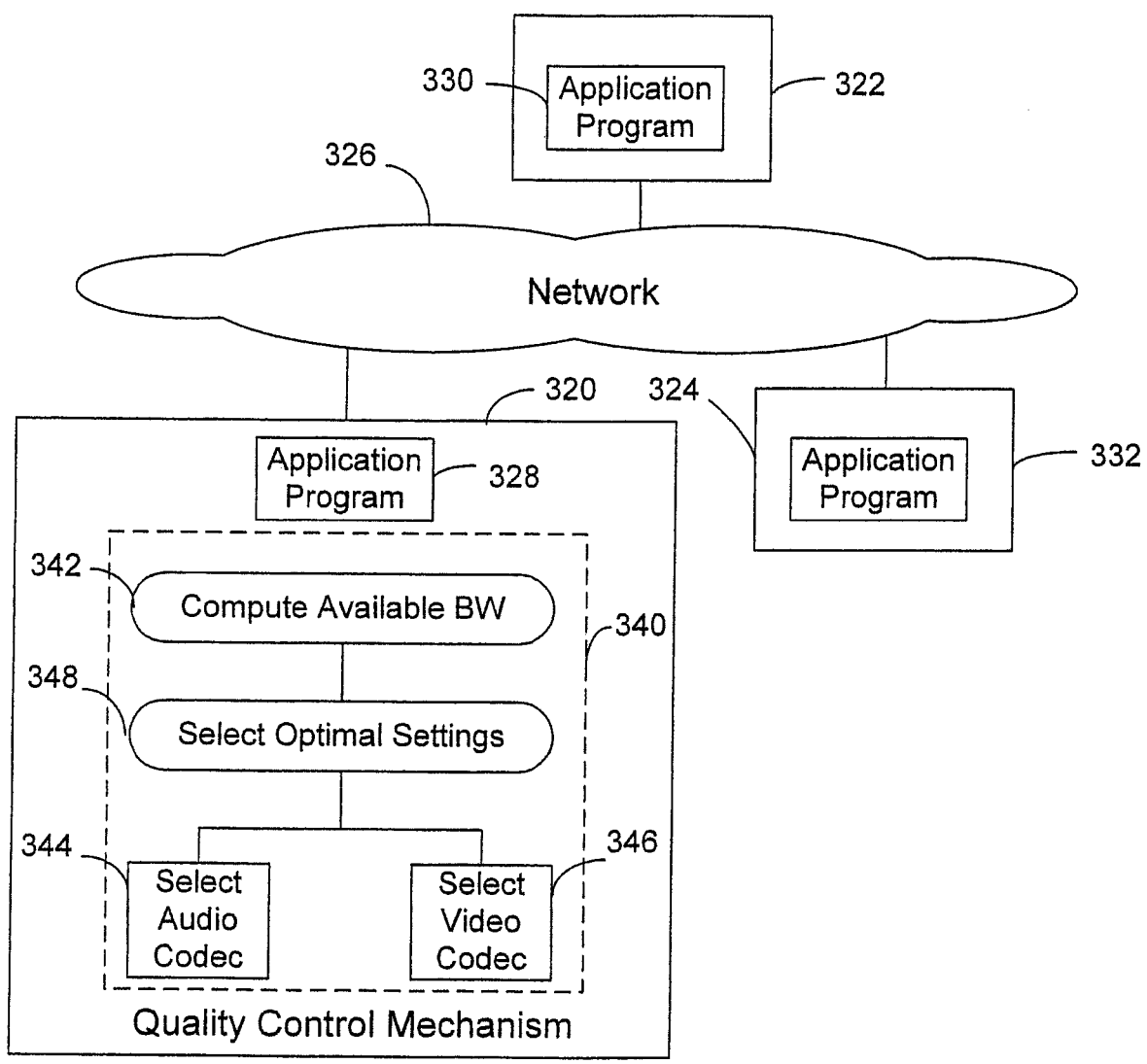
FIG. 6 is a network diagram illustrating multiple devices engaged in a real-time streaming media session in accordance with an embodiment of the invention.

Up to this point, an embodiment of the invention for approximating the bandwidth capacity between devices engaged in a real-time communication session has been presented. In the following paragraphs, however, the invention is presented with respect to means for enhancing the experience of the users of the devices engaged in the real-time communication session. For real-time communication of streaming media, a quality user experience is dictated by the speed of response, speed of delivery and accuracy of audio or video data presented to the user of a device engaged in the session. For instance, users talking to each other over the Internet would not want to experience static, intermittent sound. Rather, the users would expect a continuous stream of audio data with very low end-to-end delay. To ensure the quality of the user experience, an embodiment of the invention presents a quality control mechanism that is performed by the one or more devices exchanging streaming media during a communication session. This mechanism is illustrated by way of FIG. 6.

As shown, a plurality of devices 320, 322 and 324 connected to a network 326 engage in a communication session. Each device includes one or more network applications 328, 330 and 332 that allow users of the devices to send and receive audio, video and other streaming media. In addition to a network application 328 (e.g., a web browser), device 320 also includes a quality control (QC) mechanism 340. The quality control mechanism 340 is a computer executable module, such as an application, dynamic link library (DLL), or other module capable of being operated upon by a computing device. Alternately, the quality control mechanism can be implemented as a hardware or firmware component having machine-readable instructions and routines for providing quality control. Specifically, in accordance with an embodiment of the invention, the quality control mechanism 340 performs three primary functions that allow it to affect the quality of the user experience. These functions include the following: (1) computing the available bandwidth for outgoing data streams 342, (2) dynamically selecting an optimal audio codec to be used for outgoing audio streams 344 to increase network performance, and (3) dynamically selecting an optimal bandwidth and framerate for outgoing video streams 346 to increase network performance. Throughout the course of the detailed description, these three functions of the quality control mechanism 340 will be referenced by numerals 342, 344 and 346 respectively. Moreover, each function is illustrated procedurally in accordance with an embodiment of the invention as the flowcharts of FIGS. 7, 8 and 9 respectively.

Figure 7:
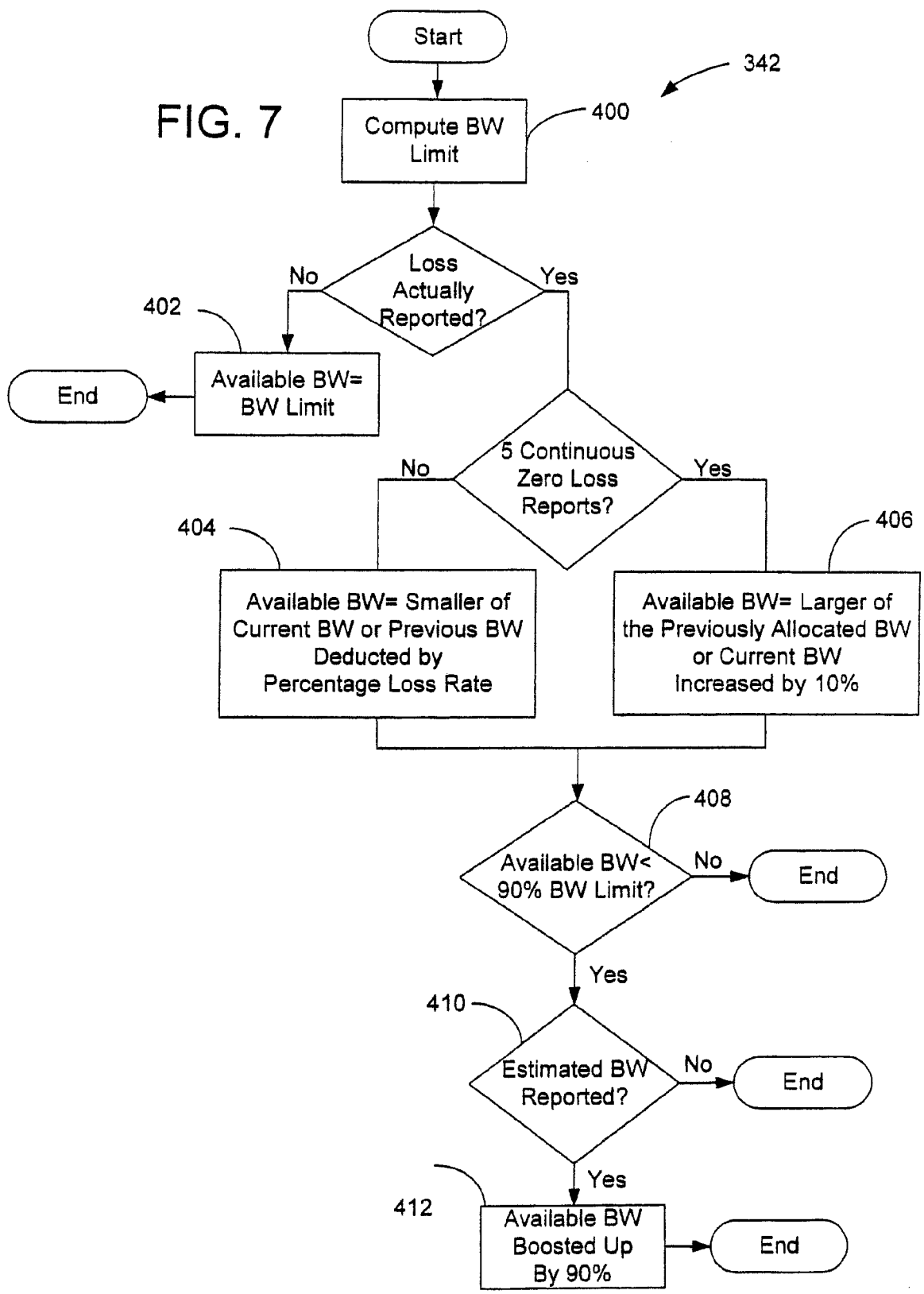
FIG. 7 is flowchart illustrating steps executed in an embodiment of the invention to calculate the available bandwidth capacity between the devices of FIG. 6.

The quality control mechanism is performed using information descriptive of the session and existing network conditions, including packet loss rate, estimated bandwidth capacity, the link speed of each device, and other factors. In an embodiment of the invention, the first primary function of the quality control mechanism—computing the available bandwidth 342—is presented, and illustrated with respect to FIG. 7. It is intended that FIG. 7 illustrate the steps involved in performing the broad task, or function, of computing the available bandwidth as performed by the quality control mechanism 340. Prior to a detailed discussion of FIG. 7, however, some of the terms used in characterizing the network conditions (such as those used in FIG. 6) will be further defined.

Determination of Available Bandwidth

The approximate bandwidth (discussed above) and available bandwidth are separate bandwidth measures. The approximate bandwidth refers to a calculation of the bandwidth that exists between devices engaged in a communication session. Hence, in the example of FIG. 6, approximate bandwidth refers to the bandwidth capacity across a complete path 120 that exists between devices. In contrast, the available bandwidth 342 is a calculation of the rate at which outgoing data streams can actually be transmitted by devices engaged in the session given existing network conditions. Thus, the available bandwidth may consider numerous factors that affect network speed and data reliability, including the following: local bandwidth, remote bandwidth, application bandwidth, estimated bandwidth, the previously allocated bandwidth, current bandwidth, current lossrate, and the number of continuous zero loss reports. All of these factors and the available bandwidth can be obtained or computed, and then reported amongst the devices engaged in the session.

Local Bandwidth

The local bandwidth is a calculation of the bandwidth capacity of a device involved in the communication session, be it the sender or receiver. Local bandwidth is given by the following relationship:

Local bandwidth (bps)=Link speed−Reserved bandwidth

Link speed is the rate at which a device can connect (link) to a network. The link speed usually depends on the processing capabilities of the device, and more particularly, the means by which the device is coupled to the network. For instance, if device 100 is coupled to the network with a T-1 line (1.44 Mbps), it can link to the network at a faster rate than if it was configured with a 56 Kbps modem. Also considered in the computation is reserved bandwidth, which is bandwidth that is reserved for usage other than audio or video streaming (e.g., Session Initiation Protocol signaling). It is given as the minimum of 20 Kbps or 40% of the detected link speed.

The local bandwidth value is specific to each device involved in the communication session, and may vary from one device to another. At the beginning of the session, prior to the exchange of meaningful and dummy control packets, the local bandwidth is restricted to be no more than 120 Kbps if the computation of the local bandwidth is greater than 200 Kbps. Compensating for the local bandwidth setting of a device in this way ensures the network is not overflowed by audio and video streams while the end to end approximate bandwidth is yet to be discovered.

Remote Bandwidth

The remote bandwidth is a value that is detected as Session Description Protocol (SDP) packets are exchanged between devices during the communication. SDP packets enable network devices, applications, and services to exchange media capabilities. For example, a handheld computing device can establish a multimedia session over the network with another PC, such as via Session Initiation Protocol (SIP). During or after the session is established, the handheld computing device can exchange SDP packets with the PC. The SDP packets exchanged during the communication process determine if audio, video or other media communication is desired. In addition, the bandwidth limitation on each device, codec information and parameters that are understood by the devices, and other appropriate media capabilities are also exchanged. The bandwidth limitation on one device provides an indication of the device's ability to receive more traffic than the advertised value. As such, the bandwidth limitation specified by one device is viewed as the remote bandwidth to the other devices.

Application Bandwidth

Application bandwidth is specified by the network application being executed by a device engaged in the session. For example, a file transfer application would specify a particular bandwidth usage for uploading or downloading files and an upper limit. In typical applications, and as described herein, the upper limit is 1 Mbps.

Estimated Bandwidth

Estimated bandwidth=Approximate Bandwidth−Reserved Bandwidth

Reserved bandwidth is given as the minimum of 10 Kbps or 30% of the estimated bandwidth. Those skilled in the art will recognize that the reserved bandwidth can be the same as the local bandwidth.

Previously Allocated Bandwidth

Previously allocated bandwidth is the available bandwidth computed at a previous time during the communication session.

Current Bandwidth

Current bandwidth is the current calculation of the available bandwidth. This is the actual total bandwidth in use for transmitting outgoing streams of data. This value is calculated persistently in response to changing network conditions during the session.

Current Lossrate

Current loss rate is the percentage of packets lost as they are sent by a sending device to receiving devices engaged in the session. Loss is a common occurrence within network communications, and is marked by a "discarding" or "dropping" of data packets as a result of network bottlenecks. A meaningful RTCP packet generally specifies this value with the fraction lost field 240 of FIG. 4.

Number of Continuous Zero Loss Reports

Zero loss rate is also indicated by RTCP, such as by the packet lost field 226 shown in the meaningful RTCP packet 200 of FIG. 4. When a zero loss report is received, the specified number of zero losses is incremented by one. When a non-zero loss report is received, the number of zero losses is set to be zero.

As illustrated in the flowchart of FIG. 7, the available bandwidth 342 for outgoing streams is calculated as a function of the above-described factors. Initially, a bandwidth limit is selected (event 400) as the lesser value of the local bandwidth, remote bandwidth, application bandwidth, or estimated bandwidth if it is available. When no loss reports are submitted during the communication, as indicated by field 226 of the RTCP packet 200, the bandwidth limit is selected as the available bandwidth setting (event 402). Otherwise, when loss is actually reported by RTCP (for example, via the report block 224 of the meaningful control packet 200), and is non-zero, the available bandwidth is selected to be the smaller of the current bandwidth or previously allocated bandwidth subtracted by the percentage lost 240 (event 404).

When zero loss is reported five continuous times during the session, the available bandwidth is selected as the larger of the current bandwidth or previously allocated bandwidth increased by 10% (event 404). Once the available bandwidth is calculated, when it is less than 90% of the bandwidth limit (event 408), and the estimated bandwidth has already been reported (event 410), the available bandwidth is boosted to be 90% of the bandwidth limit (event 412) computed during event 400.

Those skilled in the art will appreciate that the above stated percentage factors are exemplary, and in no way limit the scope or function of the invention. For instance, factors other than 10% or 90% may be designated for the purposes of calculating the available bandwidth via the quality control mechanism 340. Given the wide variety of conditions that affect network performance, these factors may vary from one network configuration to another. Ultimately, the designated factors should be of a value that provides a suitable criterion in which the quality control mechanism 340 can compensate for varying network conditions.

Selection of Optimal Data Transmission Settings

In addition to calculating the available bandwidth 342 for outgoing data streams, the quality control mechanism 340 also allows devices to select optimal data transmission settings based on the available bandwidth. In particular, the quality control mechanism 340 dynamically alters the settings for audio and video outgoing streams to provide stream smoothness and minimize interarrival jitter and delay. The adjustment of outgoing streams is applied by the quality control mechanism 340 operating on a device when it receives commands or event notifications from sources which include: a network application operating on a device in which the quality control mechanism 340 is enabled, a remote device engaged in the session, and/or the RTP module integrated within a device.

A network application triggers the quality control mechanism by adding or removing data streams, or changing the maximum bit rate setting. Such changes are commonly performed by network applications in order to account for various operations, such as downloading or uploading files, sending and receiving network messages, etc. The quality control mechanism 340 monitors the application in order to detect such adjustments, and then modifies outgoing data streams to achieve optimal network effectiveness (to be described in later sections of the description). Similarly, the quality control mechanism monitors SDP packets sent by remote devices engaged in the session. It then analyzes the contents of the packet, and adjusts the stream and bit rate settings for outgoing data streams based on this content. An adjustment to outgoing data streams is also applied according to the approximate bandwidth value that is reported by the RTP module during the exchange of meaningful and dummy control packets between devices.

All of the above-described events trigger the quality control mechanism 340 to modify the data transmission settings of devices engaged in the session. The data transmission settings that are adjusted include the bit rate, data sampling rate, frame size, etc. For audio and video data, such settings are dependent upon a codec configuration. Short for compression/decompression, a codec is any technology for compressing and decompressing data. The ability to compress and decompress data is especially important in streaming media applications due to the size of video, audio and other multimedia content, and the demand for quick delivery. Codecs can be implemented in software, hardware, or a combination of both. Some popular codecs for computer video and audio include MPEG, QuickTime and Cinepak. Table 1 below shows other audio and video codecs and their corresponding settings.

available for fulfilling network tasks. During this exchange, the SDP packets sent by each device specify the particular codecs supported by each device in order of preference. Using this information, the devices negotiate between one another to select a mutual codec preference and order to be adhered to by all of the devices during the session. For example, the devices in communication in FIG. 6 may each support multiple codecs, but negotiate an order and preference of GSM (most preferred), SIREN, G723, PCMA (least preferred). Once the mutual codec order is negotiated, each of the codecs specified (from the most preferred mutual codec to the least preferred) is compared against a codec configuration matrix, illustrated in Table 2.

TABLE 2

| Audio Codec | PTime (ms) | Outgoing Video | Bandwidth Required (Kpbs) |
|---|---|---|---|
| GSM | 40 | NO/YES | 0/0 |
| G723.1 | 30 | NO/YES | 18/63 = 18 + 45 |
| G723.1 | 60 | NO/YES | 12/52 + 12 + 40 |
| G723.1 | 90 | NO/YES | 0/0 |
| SIREN | 20 | NO/YES | 32/117 + 32 + 85 |
| SIREN | 40 | NO/YES | 24/74 + 24 + 50 |
| G722.1 | 20 | NO/YES | 40/130 = 40 + 90 |
| DVI4_8 | 20 | NO/YES | 48/143 = 48 + 95 |
| DVI4_16 | 20 | NO/YES | 80/180 = 80 + 100 |
| PCMU | 20 | NO/YES | 80/180 = 80 + 100 |
| PCMA | 20 | NO/YES | 80/180 = 80 + 100 |

TABLE 1

| Codec | Sampling Rate | Bit Rate | Frame size |
|---|---|---|---|
| Audio | | | |
| G.711 | 8 Khz | 64 Kbps | 20 ms |
| G.722.1 | 16 Khz | 24 Kbps | 20 ms |
| G.723.1 | 8 Khz | 6.4 Kbps | 30 ms, 60 ms or 90 ms |
| GSM | 8 Khz | 13 Kbps | 20 ms |
| DVI4 | 8 Khz | 32 Kbps | 20 ms |
| SIREN | 16 Khz | 16 Kbps | 20 ms or 40 ms |
| Video | | | |
| H.263-bitrate can vary from 6 to 125 Kbps | | | |

Figure 8:
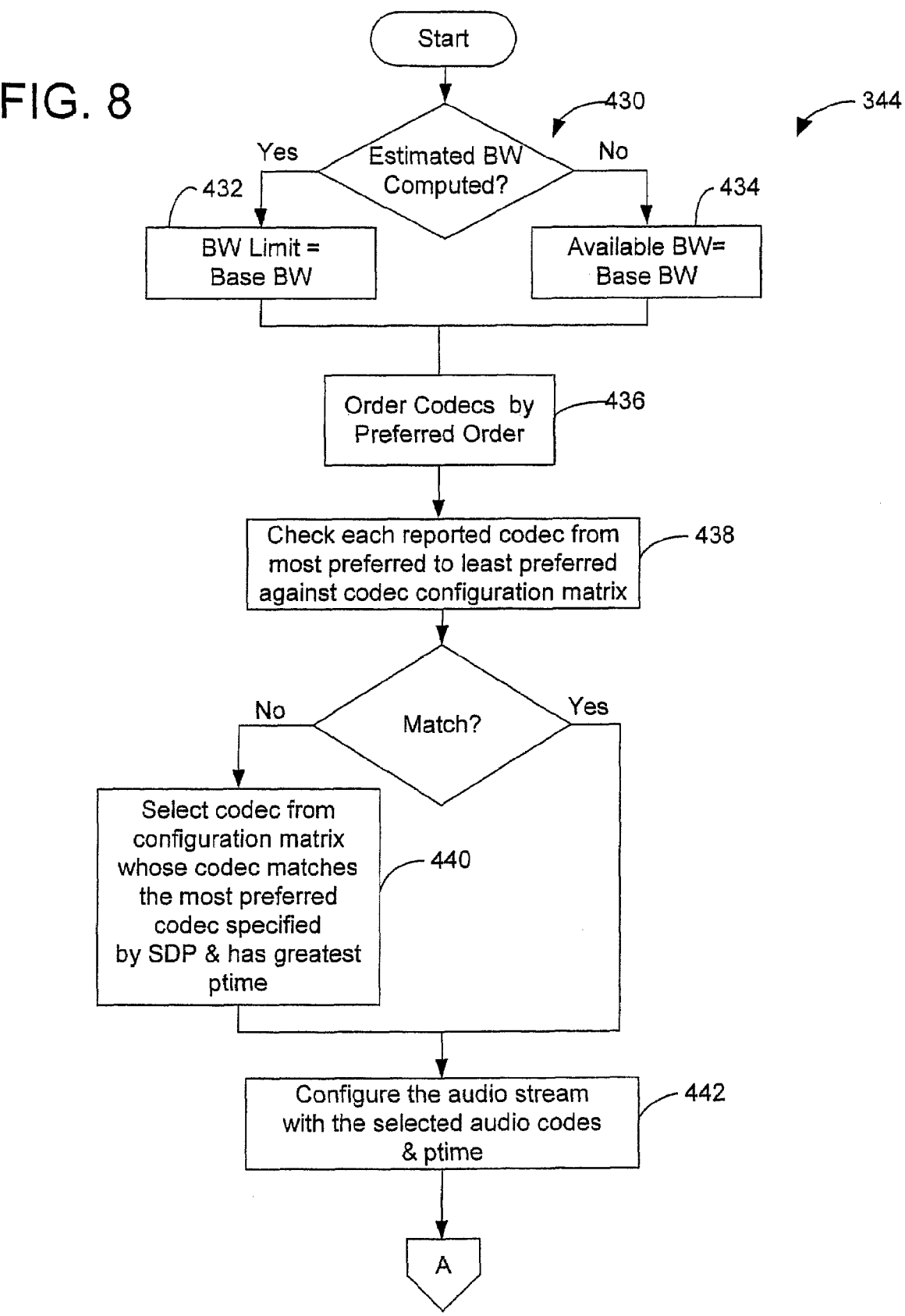
FIGS. 8-9 are flowcharts showing steps executed in an embodiment of the invention to adjust transmission settings of a device for outgoing audio streams.
Figure 9:
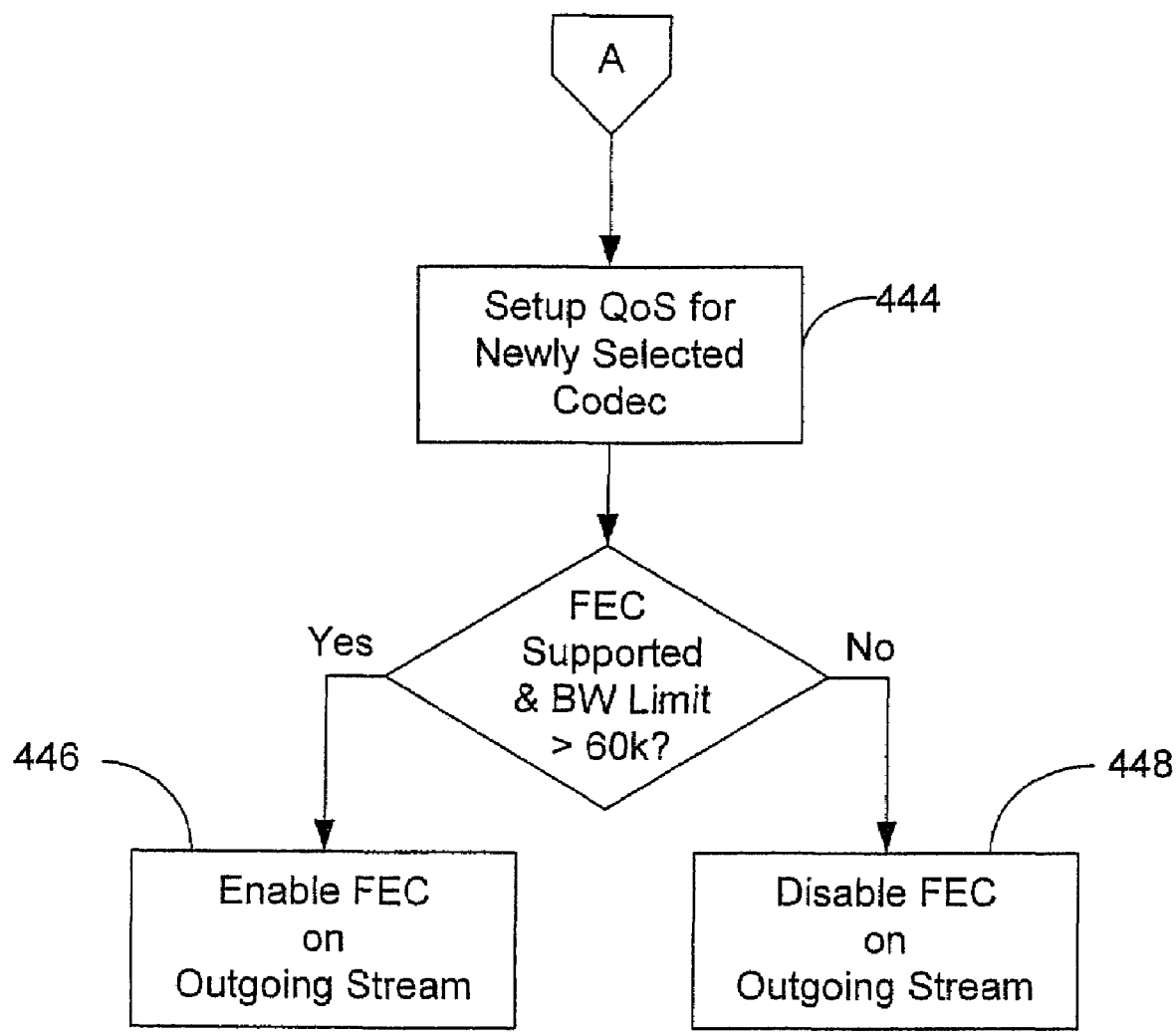

In an embodiment of the invention, an optimal codec for outgoing audio streams is selected according to various network conditions by the quality control mechanism 340, as illustrated in the flowchart of FIG. 8. These conditions include the available bandwidth 342 computation, the bandwidth limit, the presence of an outgoing video data stream, a preferred codec order as reported via SDP, the minimum bandwidth setting of devices engaged in the session, and the approximate bandwidth as reported by the RTP module. As in the computation of the available bandwidth 342, the general procedure for configuring and selecting the optimal video transmission settings, illustrated by the flowcharts of FIGS. 8 and 9, is referenced by numeral 346.

The quality control mechanism 340 first computes a base bandwidth (event 430) as the available bandwidth (event 432) when no estimated bandwidth is reported. Otherwise, the base bandwidth is selected to be the bandwidth limit (event 434), computed previously during event 400. Next, the various codecs reported by the devices engaged in the session are placed in order of preference (event 436). SDP packets, as discussed previously, are exchanged between devices to facilitate the communication process, and identify services The codec configuration matrix is a table maintained by the quality control mechanism 340 for showing the minimum bandwidth values required for selecting a specific audio codec. Specifically, the configuration matrix defines the criteria to be used by the quality control mechanism 340 for selecting an optimal codec to be applied by the devices involved in the real-time communication session. Each mutual codec, starting from the most preferred to least preferred, is compared against each row of the matrix (event 438). When any row in the table matches the codec, the presence of outgoing video streams, and the base bandwidth is greater than or equal to the required bandwidth, the corresponding codec is selected (event 442). When none of the codecs match up with a value specified in the configuration matrix (e.g., a particular row of the matrix), the quality control mechanism 340 selects the codec from the configuration matrix whose codec matches the most preferred mutual codec, and that has the greatest ptime (packet time) (event 440). Upon selecting a codec, the audio stream of the device transmitting data is configured with the selected audio codec and ptime (event 442).

QoS, or Quality of Service, is then setup for the newly selected audio codec (event 444 of FIG. 9) when supported by the device. In network applications, QoS refers to a characteristic of a networking protocol for providing consistent, predictable data delivery even during adverse network conditions. Enabling QoS, as illustrated in the embodiment, ensures that outgoing streams are transmitted according to the selected codec. Similar to QoS, forward error correction (FEC) is a service that also improves network performance during streaming media sessions. FEC allows corrupted packets to be recovered, thus preventing their retransmission and increasing the operating range of networked devices. When a remote device engaged in the session supports FEC, and the bandwidth limit is greater than 60 Khz, FEC is enabled for outgoing data streams (event 446). When a remote device does not support FEC it is disabled (event 448).

Figure 10:
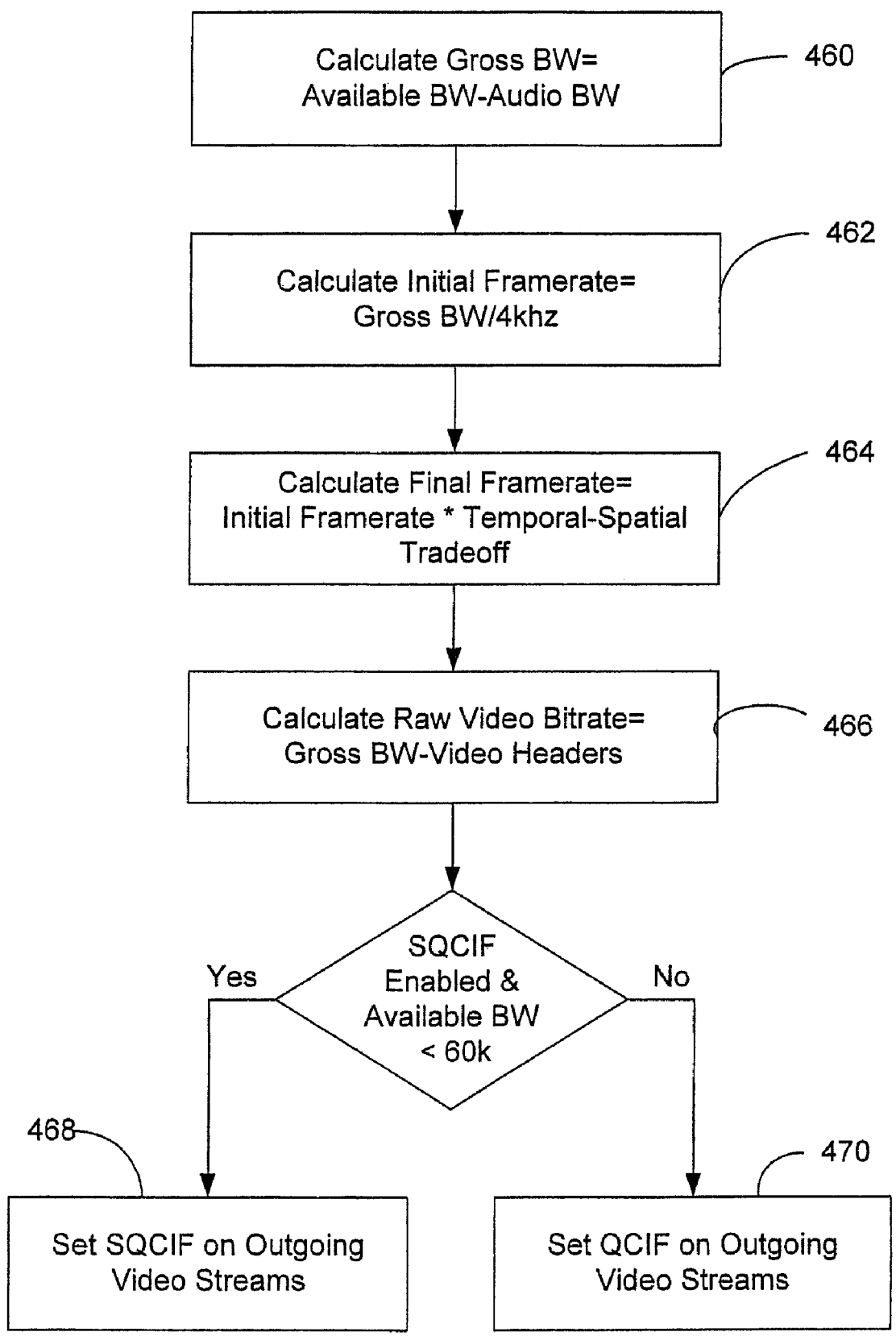
FIG. 10 is a flowchart showing steps executed in an embodiment of the invention to adjust transmission settings of a device for outgoing video streams.

In addition to improving outgoing audio streams, as described above, the quality control mechanism 340 also selects optimal data transmission settings to improve outgoing video streams. These settings are based upon various network factors, including the available bandwidth, the gross bandwidth for outgoing video streams, and the temporal-spatial trade off value set by a network application that facilitates the session. In an embodiment of the invention, optimal video bandwidth and framerate settings of a device are configured by the quality control mechanism 340, as illustrated in the flowchart of FIG. 10. The general procedure for configuring and selecting the optimal video transmission settings, as illustrated by the flowchart of FIG. 10, is referenced as numeral 346.

The gross bandwidth for outgoing video streams is calculated as the available bandwidth minus the audio bandwidth determined for outgoing audio streams (as described in the preceding paragraphs) (event 460). Once the gross bandwidth is determined, the initial video framerate is calculated by dividing the gross bandwidth value by 8 Khz (event 462). The resultant initial framerate value is adjusted by the quality control mechanism 340 so that it is not lower than 2 fps (frames/sec) or greater than 24 fps. Upon calculating the initial framerate, the final framerate is then calculated as the product of the initial framerate and temporal-spatial trade off value (event 464). Temporal-spatial tradeoff specifies the trade off between the size of the video frame and the number of frames per second. Given the bandwidth available for video streaming, better quality video images (or frames) are generally larger in size and thus allow fewer frames per second. A higher temporal-spatial tradeoff indicates the preference on the quality of each image while a smaller value indicates the preference on the overall image smoothness. By default, the temporal-spatial tradeoff is set to 50%. The final framerate value is a floating number between 1 fps and 12 fps.

The next procedure performed is a calculation of the raw video bitrate (event 468). This value is computed by subtracting the video header values (indicated in video data packets) from the gross video bandwidth calculated during event 460. Raw video bitrate provides an indication of the maximum bandwidth capacity available for outgoing streams by a sending device involved in the communication.

After determining the bandwidth available for the transmission of video, the remaining task is to properly configure the video capturing and encoding component of the device performing the transmission. Two factors are considered in determining the proper configuration: the quality of each video image and the number of images (or frames) per second. Equations for computing the appropriate configuration are given by:

gross bandwidth=raw video bandwidth+header bandwidth header bandwidth=header overhead*framerate In the above equations, the gross bandwidth is known as well as the header overhead value (which is the size of a standard RTP packet header plus any attached UDP and IP header). Objectively, the raw bandwidth and the framerate need to be determined in order to configure the video capturing and encoding component of the device. Heuristically setting the framerate to be the gross bandwidth divided by 8 K, and then adjusting the framerate by the temporal-spatial tradeoff value accomplishes this. Once the framerate is finalized, the raw video bandwidth is computed.

As a further means of optimizing outgoing streams, SQCIF and QCIF are enabled for devices involved in the communication. QCIF (Quarter Common Intermediate Format) and SQCIF (Sub Quarter Common Intermediate Format) are video data formats that specify the data rate and frame parameters to be used for outgoing streams. When SQCIF is supported in the registry settings of a device engaged in the session, and the available bandwidth is determined to be less than 60 Khz, SQCIF is set for outgoing video streams (event 468). Otherwise, QCIF is set for outgoing video streams (event 470).

As presented herein, numerous percentage factors or multiplier values are applied by the quality control mechanism in performing its various functions. However, those skilled in the art will appreciate these factors are simply illustrative, and in no way limit the scope or function of the invention. For instance, in computing the available bandwidth 342, percentage factors other than 10% as in event 406, or 90% as in event 412 may be designated for the purposes of calculating the available bandwidth via the quality control mechanism 340. Given the wide array of conditions that affect network performance, these factors may vary from one network configuration to another. Likewise, the designated factors may vary depending upon the specific requirements of session in which the devices are engaged. Ultimately, the designated factors can be any value that provides a suitable criterion in which the quality control mechanism 340 can compensate for varying network conditions to maximize the user experience.

Overall, the invention provides a convenient means of approximating the bandwidth capacity that exists over a network, and particularly between devices engaged in a streaming media session. By sending dummy packets along with each meaningful data packet, persistent probing of the network is performed, which allows each device involved in a real-time communication session to be aware of the bandwidth as network conditions change. Those skilled in the art will appreciate that the method and system of the invention reduces the amount of packets that are placed onto the network for performing bandwidth estimation. This is because the network is probed using information contained within the control packets that are sent out normally during the communication. As such, there is no need for separate probing packets to be placed onto the network in addition to the control packets, as is common to perform conventional bandwidth estimation techniques.

Also, the invention provides a means for dynamically altering the data transmission settings of devices engaged in a streaming media session in response to changing network conditions. Particularly, these settings are adjusted as the real-time communication session is carried out (hence dynamically) according to various network criteria, including the bandwidth approximation. By altering the transmission settings dynamically, devices communicating over a network can instantly adjust outgoing data streams to provide increased data flow and minimized packet delay. This is useful for optimizing the exchange of audio and video data between devices, where network conditions such as bottlenecks and data corruption can negatively impact the user experience.

Those skilled in the art will appreciate that the above stated percentage factors are exemplary, and in no way limit the scope or function of the invention. For instance, factors other than 10% or 90% may be designated for the purposes of calculating the available bandwidth via the quality control mechanism 340. Given the wide variety of conditions that affect network performance, these factors may vary from one network configuration to another. Ultimately, the designated factors should be of a value that provides a suitable criterion in which the quality control mechanism 340 can compensate for varying network conditions.

In view of the many possible embodiments to which the principles of this invention may be applied, it should be recognized that the embodiment described herein with respect to the drawing FIGS. is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A system for optimizing real-time communication between one or more devices on a network, the system comprising:
    one or more devices coupled to the network for transmitting one or more meaningful control packets and one or more dummy control packets during the real-time communication; and
    a quality control mechanism residing on at least one device for adjusting the data transmission settings of the one device based on the difference in arrival times between at least one of the meaningful control packets and at least one of the dummy control packets,
    wherein adjusting the data transmission settings includes computing a quotient resulting from the division of the size of the meaningful control packets and dummy control packets by the difference in arrival times of the meaningful control packets and dummy control packets.

2. The system of claim 1 further comprising a network application residing on at least one of the devices.

3. The system of claim 1 wherein the one or more devices generate the one or more meaningful control packets and one or more dummy control packets according to the same control protocol.

4. A computer-storage medium embedded with computer-executable instructions for optimizing real-time communication between remote devices on a network, by a method comprising:
    receiving a meaningful control packet from a remote device at an arrival time;
    receiving a dummy control packet from the remote device at an arrival time, the dummy control packet and the meaningful control packet having a format conforming to a same control protocol; and
    approximating bandwidth available on the network based on the difference in arrival times between the meaningful control packet and the dummy control packet,
    wherein the step of approximating includes computing a quotient resulting from the division of the size of the meaningful control and dummy control packets by the difference in arrival times of the meaningful control packets and dummy control packets.

5. The computer-storage medium of claim 4 further comprising reporting the approximated bandwidth to the remote device.

6. The computer-storage medium of claim 4 including adjusting data transmission setting between the remote devices based on the approximated bandwidth.

7. The computer-storage medium of claim 4 wherein the approximating comprises computing a bandwidth limit as the minimum of a local bandwidth, remote bandwidth, application bandwidth, and estimated bandwidth.

8. The computer-storage medium of claim 7 wherein the computing comprises selecting the bandwidth limit as the bandwidth available on the network when no data is reported as lost over the network.

9. The computer-storage medium of claim 4 wherein the approximating comprises determining bandwidth available on the network as the smaller of a current bandwidth or a previously allocated bandwidth when meaningful control packets and dummy control packets are reported as lost over the network.

10. The computer-storage medium of claim 9 wherein the smaller of the current bandwidth or the previously allocated bandwidth is deducted by an amount representing a percentage of the meaningful control packets and dummy control packets lost.

11. The computer-storage medium of claim 4 wherein the approximating comprises determining bandwidth available on the network as the larger of a current bandwidth or a previously allocated bandwidth when no meaningful control packets and dummy control packets are reported as lost over the network.

12. The computer-storage medium of claim 4 wherein the approximating comprises increasing the bandwidth available on the network by a designated factor when a bandwidth limit is determined to be greater in value than the bandwidth available on the network by the same designated factor.

13. A host system for optimizing real-time communication between remote devices on a network, comprising:
    at least one processing unit;
    a memory, communicatively coupled to the at least one processing unit and storing computer-executable instructions that, when executed by the at least one processing unit, perform the following method:
    receiving a meaningful control packet from a remote device at an arrival time;
    receiving a dummy control packet from the remote device at an arrival time, the dummy control packet and the meaningful control packet having a format conforming to a same control protocol; and
    approximating bandwidth available on the network based on the difference in arrival times between the meaningful control packet and the dummy control packet,
    wherein the step of approximating includes computing a quotient resulting from the division of the size of the meaningful control and dummy control packets by the difference in arrival times of the meaningful control packets and dummy control packets.

* * * * *